United States Patent
GK et al.

(10) Patent No.: US 8,028,178 B2
(45) Date of Patent: Sep. 27, 2011

(54) SYSTEM AND METHOD FOR PROVIDING EXTERNAL POWER ON A UNIVERSAL SERIAL BUS

(75) Inventors: Siddhartha GK, Tempe, AZ (US); David M. Schlueter, Lake Villa, IL (US); Richard T. Unetich, Chicago, IL (US)

(73) Assignee: Freescale Semiconductor, Inc., Austin, TX (US)

( * ) Notice: Subject to any disclaimer, the term of this patent is extended or adjusted under 35 U.S.C. 154(b) by 413 days.

(21) Appl. No.: 12/207,290

(22) Filed: Sep. 9, 2008

(65) Prior Publication Data

US 2010/0064153 A1    Mar. 11, 2010

(51) Int. Cl.
    *G06F 1/26* (2006.01)
(52) U.S. Cl. .................................. 713/310; 713/330
(58) Field of Classification Search .................. 713/300, 713/310, 320, 330, 340; 320/107–114, 160–165
    See application file for complete search history.

(56) References Cited

U.S. PATENT DOCUMENTS

| | | | |
|---|---|---|---|
| 6,515,459 B1 | 2/2003 | Ottinger et al. | |
| 7,145,842 B2 | 12/2006 | Kobayashi | |
| 7,340,627 B1 | 3/2008 | Harvey | |
| 2003/0135766 A1 | 7/2003 | Zyskowski et al. | |
| 2006/0181241 A1* | 8/2006 | Veselic | 320/107 |
| 2006/0271797 A1 | 11/2006 | Ginggen et al. | |
| 2007/0029975 A1 | 2/2007 | Martin et al. | |
| 2007/0188134 A1 | 8/2007 | Hussain et al. | |
| 2009/0102431 A1* | 4/2009 | Kung et al. | 320/162 |
| 2009/0174366 A1* | 7/2009 | Ahmad et al. | 320/114 |

OTHER PUBLICATIONS

PCT Application No. PCT/US2009/048776; Search Report and Written Opinion dated Feb. 17, 2010.

* cited by examiner

*Primary Examiner* — Raymond Phan
(74) *Attorney, Agent, or Firm* — Gary R. Stanford

(57) ABSTRACT

A universal serial bus power control circuit including at least one first switch which selectively couples a power source node to an external power node, a comparator which detects when the external power node is charged, a feedback node for enabling voltage regulation, a charge circuit and a controller. The charge circuit charges the external power node from the power source node and selectively couples the feedback node to at least one of the power source node and the external power node. The controller opens the first switch when the external power node is not charged, controls the charge circuit to charge the external power node while coupling the feedback node to the power source node, and closes the first switch and couples the feedback node to the external power node in a host mode when the external power node is charged.

20 Claims, 6 Drawing Sheets

(USB OFF)

(USB PERIPHERAL MODE)

(CHARGE MODE)

(USB HOST MODE)

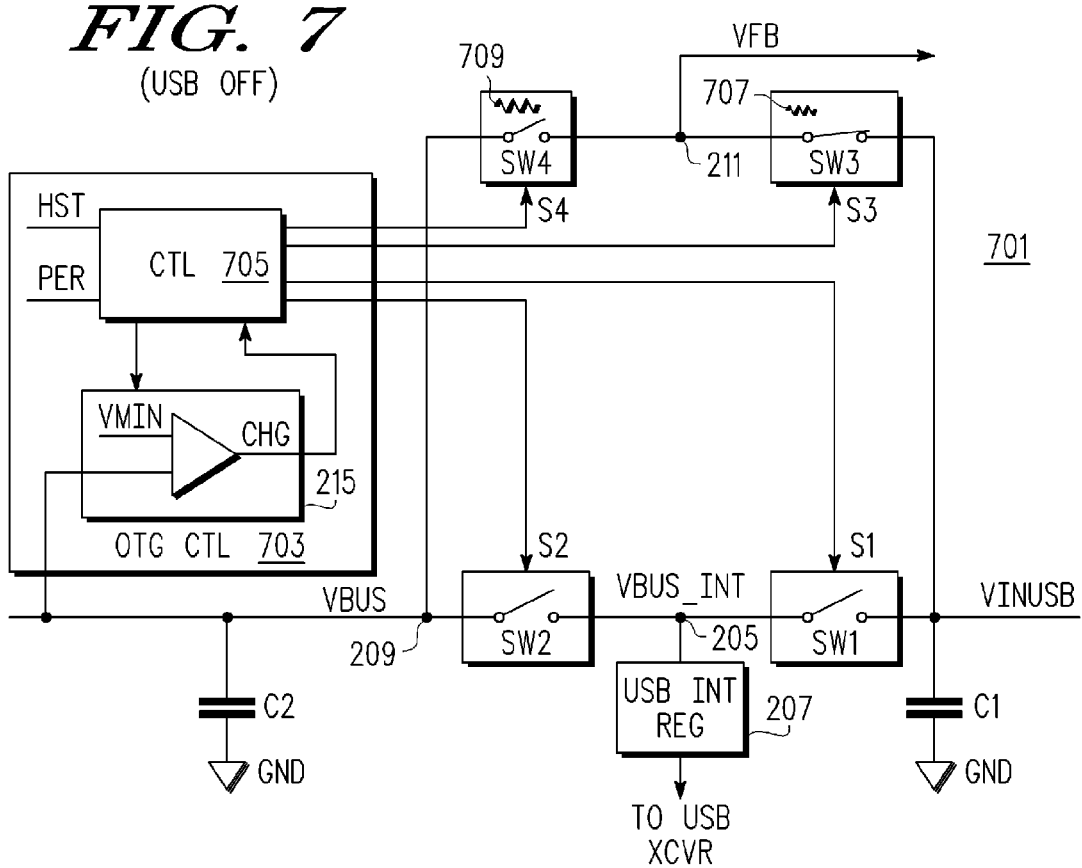
FIG. 7 (USB OFF)
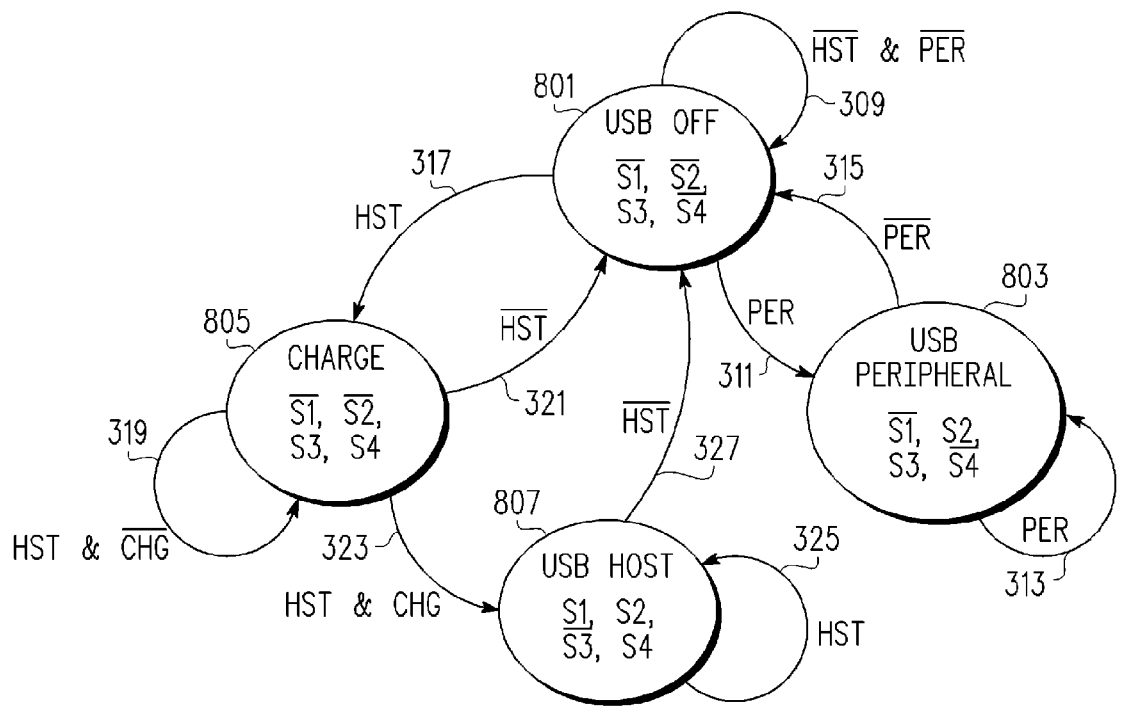
FIG. 8

(USB PERIPHERAL MODE)

(CHARGE MODE)

(USB HOST MODE)

SYSTEM AND METHOD FOR PROVIDING EXTERNAL POWER ON A UNIVERSAL SERIAL BUS

BACKGROUND OF THE INVENTION

1. Field of the Invention

The present invention relates in general to power control for Universal Serial Bus (USB) devices, and more specifically to a system and method of adaptive feedback power control for charging the external voltage of a USB device.

2. Description of the Related Art

The Universal Serial Bus (USB) was designed to allow multiple peripheral devices to be connected to a host computer system. USB uses a single standardized interface socket to improve plug-and-play capabilities by allowing devices to be connected and disconnected without rebooting the computer system. USB has become the standard connection method for many peripheral devices. For example, USB is often used to connect computer peripheral devices such as a computer mouse, keyboard, personal digital assistants (PDAs), gamepads and/or joysticks, scanners, digital cameras, printers, communication ports (e.g., serial, parallel, etc.), personal media players, flash drives, storage drives, mobile phones (e.g., cellular phones and the like), etc. The USB connection may be used for communications or for providing power (such as charging a battery of a portable device) or both. USB was originally designed for connecting peripheral devices to personal computers, but USB has become commonplace on other devices such as PDAs, handhelds, video game consoles, mobile phones, car stereos, etc. USB is currently described by the USB 2.0 Specification, which includes the earlier USB 1.1 Specification and which introduces a third, higher speed. Future USB Specifications are contemplated for providing greater capabilities and/or higher speeds, such as, for example, the anticipated USB 3.0 Specification.

USB On-The-Go (OTG) is a supplement to the USB Specification 2.0 which allows two USB devices to communicate without requiring the services of a host computer system. USB-OTG retains the standard USB host and peripheral model in which one host communicates with one or more USB peripheral devices. Some devices, such as personal computers and the like, might be configured only to operate as a host whereas many conventional peripheral devices may be configured only to operate as peripheral devices. OTG introduces a dual-role device (DRD) in which at least one device is capable of functioning either as a host or as a peripheral and the initially assigned or default roles may be swapped. Once connected, OTG DRD devices can exchange host/peripheral roles using a Host Negotiation Protocol (HNP). In certain configurations the cable orientation determines the initial or default roles of coupled devices. If the roles need to be reversed or if the cable orientation is backwards (such as when a peripheral-only device is determined as the initial host device according to the cable orientation), HNP enables the devices' roles to reverse automatically and silently regardless of the cable orientation and without requiring the USB cable to be reversed.

The host device provides power to the peripheral device via the USB cable. A host device or OTG DRD device typically includes an internal power regulator for regulating power supply voltage to device circuitry. The device further includes USB circuitry and a USB port for interfacing external devices via the USB cable. The USB circuitry includes a USB transceiver for communicating to other devices via the USB port and cable. The USB port and cable includes a VBUS signal and a ground signal for providing or receiving power. If the USB device is an OTG DRD device operating as a peripheral device, or if it is a peripheral-only type device, then an external host provides power to the USB transceiver via the USB port. If the USB device is operating as a host device, however, then the device itself provides the power to its transceiver and to external devices via the USB port. It is possible for the host to have two additional regulators (other than the device internal power regulator) including a first regulator for providing power to the internal USB transceiver and a second regulator for providing power to external devices. Such configuration is relatively inefficient and costly. It is desired to use the device internal power regulator to provide power to the internal USB transceiver and to external devices in an efficient and cost-effective manner. Such power configuration should be implemented in such a manner to avoid drop or overshoot of the regulator voltage which might otherwise cause instability and/or unreliable operations of the USB devices.

BRIEF DESCRIPTION OF THE DRAWINGS

The benefits, features, and advantages of the present invention will become better understood with regard to the following description, and accompanying drawings where:

FIG. 7 is a schematic and block diagram of a USB power control circuit according to another embodiment which may also be used as the USB power control circuit of FIG. 1;

FIG. 8 is a state diagram illustrating exemplary operation of the controller of FIG. 7 for controlling the switches SW1-SW4 to switch between USB OFF, USB PERIPHERAL, CHARGE, USB HOST modes of operation according to an exemplary embodiment;

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

Figure 1:
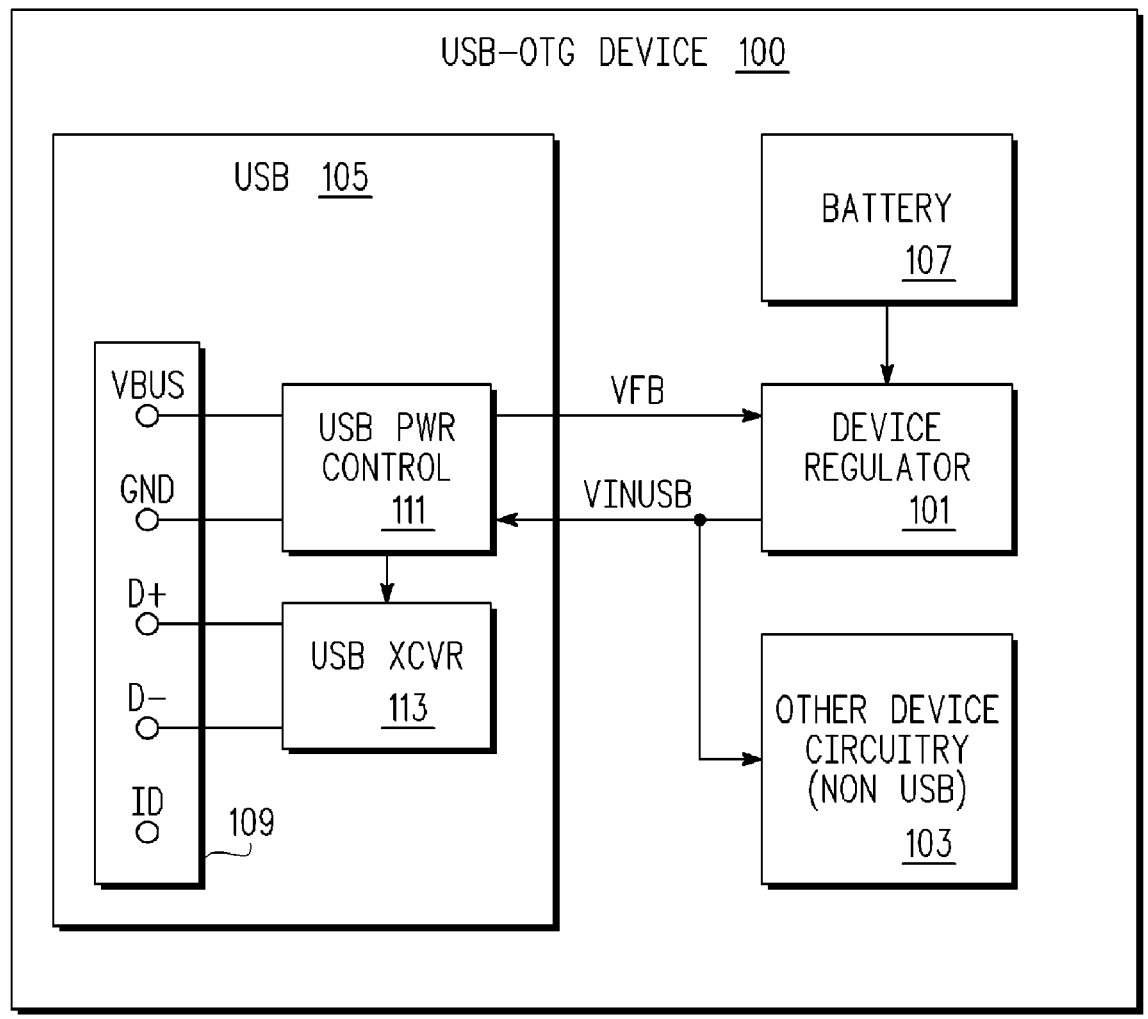
FIG. 1 is a simplified block diagram of a USB-OTG device including a USB circuit implemented according to an exemplary embodiment.

FIG. 1 is a simplified block diagram of a USB-OTG device 100 including a USB circuit 105 implemented according to an exemplary embodiment. The USB-OTG device 100 includes an internal device regulator 101 for providing power via a VINUSB voltage to other internal circuitry of the device 100, shown as other device circuitry 103. The other device circuitry 103 includes non-USB circuitry that does not include the USB circuit 105. The configuration and implementation of the device circuitry 103 includes the particular electronic circuitry used to support the particular type of device and is not further shown or described. The USB-OTG device 100 is any type of computing device, including, for example, mobile or portable computing devices such as hand-helds, mobile phones, digital cameras, communication devices, PDAs, etc. As shown, the USB-OTG device 100 includes a battery 107 providing power to the device regulator 101. The battery 107 may be of any type including removable or non-removable and/or rechargeable or non-rechargeable. Alternatively, the USB-OTG device 100 may receive power via other methods, such as from AC power or the like in which case an AC to DC converter (not shown) is included. The device regulator 101 is implemented according the power requirements of the USB-OTG device 100, such as a linear regulator, a buck-type regulator (voltage reducing regulator), a boost-type regulator (voltage increasing regulator), etc., and regulates the voltage of VINUSB at a suitable voltage level. In one embodiment, the VINUSB voltage is regulated to approximately 5 Volts (V).

The USB circuitry 105 includes a USB port 109, a USB power (PWR) control circuit 111 and a USB transceiver (XCVR) 113. The USB port 109 includes VBUS and ground (GND) signals in which the VBUS voltage is conveyed by the VBUS signal relative to GND. The USB port 109 further includes USB communication signals D+ and D− and an identification (ID) signal as known to those skilled in the art of USB-OTG. The VINUSB voltage is provided to an input of the USB power control circuit 111, which is further coupled to the VBUS and GND signals of the USB port 109. The USB power control circuit 111 is coupled to the USB XCVR 113, which is further coupled to the D+ and D− communication signals of the USB port 109. The USB power control circuit 111 provides a voltage feedback signal VFB to the device regulator 101 for regulating the voltage of VINUSB or VBUS as further described below. The USB power control circuit 111 determines the operating role or mode and transfers power as appropriate. For example, when the USB-OTG device 100 is operating as a peripheral device, the USB power control circuit 111 transfers power from an external device (not shown) via the VBUS and GND signals to the USB XCVR 113. When the USB-OTG device 100 is operating as a host device, the USB power control circuit 111 transfers power from the VINUSB to the USB XCVR 113 and to the external device via the VBUS and GND signals.

Figure 2:
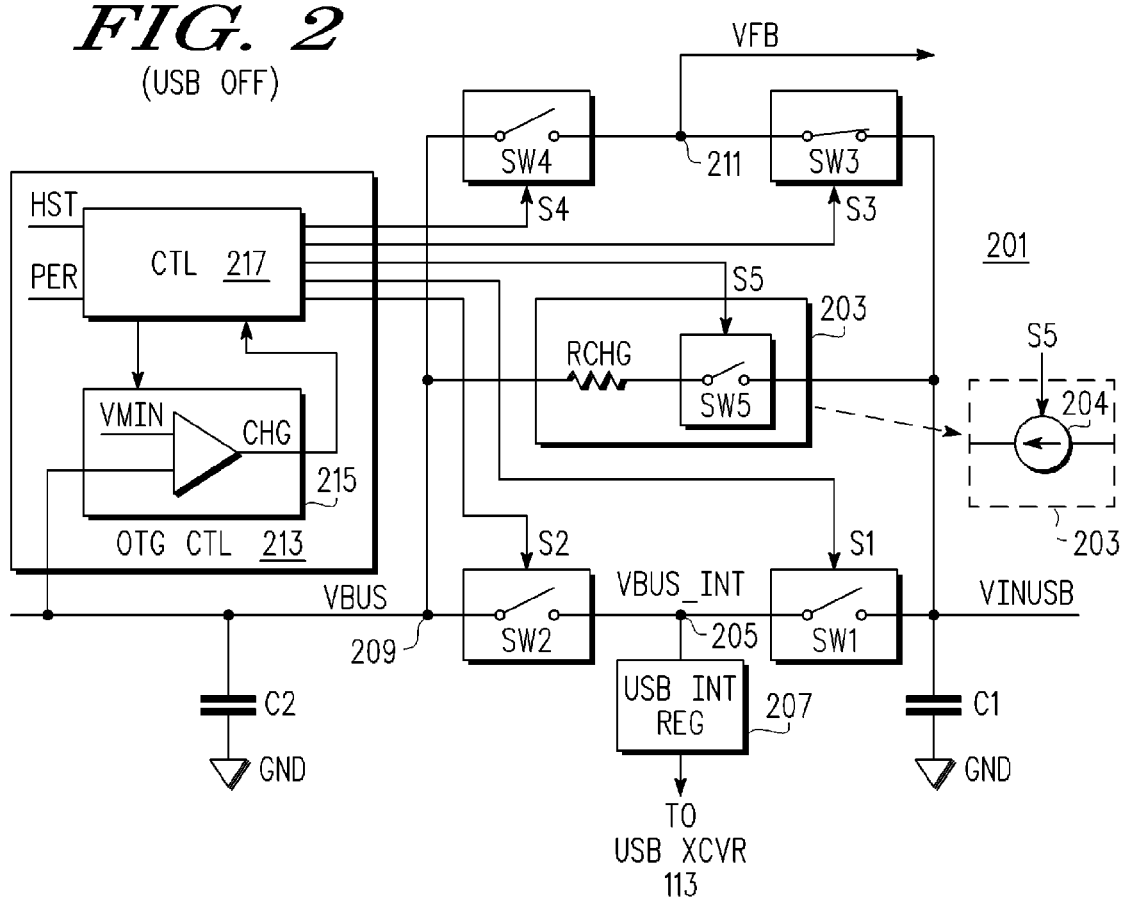
FIG. 2 is a schematic and block diagram of a USB power control circuit according to one embodiment which may be used as the USB power control circuit of FIG. 1.

FIG. 2 is a schematic and block diagram of a USB power control circuit 201 according to one embodiment which may be used as the USB power control circuit 111. The VINUSB voltage is coupled to one end of a capacitor C1, and to one switched terminal of each of several single-pole, single throw (SPST) switches SW1, SW3 and SW5. Switch S5 is provided within a charge circuit 203 described further below. The other end of the capacitor C1 is coupled to GND. It is noted that one "GND" signal is shown as a general reference voltage, although it is understood that multiple and/or separate reference voltage levels (e.g., signal ground, power ground, voltage reference buses, etc.) may be used. The SW1 has a second switched terminal coupled to a node 205 which is further coupled to a switched terminal of another SPST switch SW2. Node 205 develops an internal source voltage VBUS_INT providing source voltage to an input of a USB internal regulator (INT REG) 207, which has an output coupled to provide regulated voltage to the USB XCVR 113. The SW2 has a second switched terminal coupled to a node 209 which is further coupled to the VBUS signal conveying the VBUS voltage and to one end of another capacitor C2. The other end of the capacitor C2 is coupled to GND. Node 209 is further coupled to one end of a charge resistor RCHG within the charge circuit 203 and to a switched terminal of another SPST switch SW4. The other switched terminal of the switch SW4 is coupled to a node 211 providing the VFB voltage, which is further coupled to the other switched terminal of the switch SW3. The other end of the resistor RCHG is coupled to the other switched terminal of the switch SW5 within the charge circuit 203.

The USB power control circuit 201 further includes a USB control circuit 213, which includes a comparator circuit 215 coupled to a mode and switch controller 217. The VBUS voltage is provided to one input of the comparator circuit 215 having another input receiving a predetermined minimum voltage level VMIN and having an output developing a charge signal CHG, in which the CHG signal is provided to an input of the controller 217. The controller 217 determines the USB mode of operation including a USB OFF mode, a USB PERIPHERAL mode, and a USB HOST mode as further described below. The USB HOST mode is indicated by assertion of a host signal HST and the USB PERIPHERAL mode is indicated by assertion of a peripheral signal PER. The HST and PER signals may be inputs, outputs or bidirectional signals depending upon which circuitry detects the USB mode of operation. The controller 217 provides signals S1, S2, S3, S4 and S5 (S1-S5) for controlling the states of the switches SW1, SW2, SW3, SW4 and SW5 (SW1-SW5), respectively. In the illustrated embodiment, positive logic is used in which each of the switches SW1-SW5 is activated or closed when a corresponding one of the switch control signals S1-S5 is asserted high, and is de-activated or opened when the corresponding switch control signal is asserted low. It is noted that negative logic is equally applicable in which logic states and/or polarities may be inverted or otherwise reversed.

FIG. 2 illustrates the USB power control circuit 201 in the USB OFF mode since both switches SW1 and SW2 are shown in the opened position. In this manner, the USB internal regulator 207 does not receive power from either VINUSB or VBUS so that the USB XCVR 113 is powered down. Also, the switch SW4 is opened whereas SW3 is closed. In this manner, VFB is coupled to VINUSB via the switch SW3 so that the device regulator 101 regulates the voltage of VINUSB to a predetermined voltage level. Furthermore, the switch SW5 is opened so that VBUS is isolated from VINUSB so that the voltage of VBUS is zero or some other low voltage value (unless driven to another voltage by an external device coupled to the USB port 109). The switches SW1-SW5 may be implemented as electronic switches, such as N-channel or P-channel field-effect transistors, or metal-oxide semiconductor FETs (MOSFETs) or the like, although other types of switches or transistors are contemplated.

The switches SW3 and SW4 and the charge circuit 203 could be eliminated so that only the switches SW1 and SW2 determine the USB mode of operation. In this alternative case, VFB is coupled directly to VINUSB for purposes of directly regulating its voltage rather than through switched devices as shown. The switches SW1 and SW2 are opened as shown in FIG. 2 when the USB circuit 105 is off. In the peripheral mode of operation, SW2 is closed while SW1 remains opened so that an external device provides voltage via the VBUS voltage to the USB internal regulator 207 to source power to the USB XCVR 113. In the host mode, both switches SW1 and SW2 are closed so that the device regulator 101 provides power to the USB internal regulator 207 and to the external devices via the VBUS voltage. External devices coupled to VBUS and GND may draw a significant amount of current. In one embodiment, for example, the external devices may draw approximately 200 milliamps (mA) of current. The USB internal regulator 207 also draws a significant level of current. In one embodiment, for example, the USB internal regulator 207 may draw approximately 100 milliamps (mA) of current. In this manner, a current of approximately 300 mA flows through switch SW1 and a current of 200 mA flows through switch SW2 during the host mode. As understood by those skilled in the art, electronic switches include an inherent resistance when turned on, such as drain-to-source resistance or the like. Such series switch resistance generates a series voltage and consumes power when activated and while load current is flowing. Relatively large resistances cause relatively large voltage drops and consume valuable power. The series switch resistances may be reduced by increasing the physical size of the devices implementing the switches, but such would alternatively consume space. Space and power consumption are commodities in portable or mobile electronic USB-OTG devices.

The switches SW1 and SW2 collectively establish a single switch function to enable the internal VINUSB to provide power to the external VBUS. The switches SW1 and SW2 could be replaced with one switch between SW1 and SW2 (such as if VBUS_INT were not provided or otherwise not sourced from VINUSB). Two switches are used to enable VBUS_INT to be selectively coupled to either one of VINUSB or VBUS depending upon the mode of operation. In any event, if only switches SW1 and SW2 (or one singular switch) were provided without an additional charge path, then several technical challenges are presented. If used alone, the switches SW1 and SW2 would have to be very large to minimize switch resistance. In that case, closing both switches SW1 and SW2 to enable the host mode results in large transients which causes significant problems. In particular, when both switches SW1 and SW2 are turned on to enable host mode of operation when VBUS and VBUS_INT are both very low or zero voltage, then VINUSB initially droops by a significant amount to charge the capacitor C2. For example, if VINUSB is normally regulated at about 5V, VINUSB might initially droop to 3V or less during initial host activation when both switches SW1 and SW2 are closed. Such significant initial voltage drop is problematic for the device circuitry 103 and may cause unreliable operations or even device failure.

Also, in an attempt to recover voltage regulation when VINUSB droops significantly, the device regulator 101 may drive VINUSB to overshoot the target voltage level resulting in similar problems and possible failure. In this manner, the switches SW1 and SW2 would have to be made very large to minimize the voltage drop across the switches SW1 and SW2 to maintain VBUS at a suitable voltage level since the device regulator 101 regulates VINUSB rather than VBUS. Any significant voltage drop across the switches SW1 and SW2 potentially results in poor load regulation of VBUS particularly during load fluctuations. Yet the large area consumed by very large electronic switches SW1 and SW2 results in very inefficient space utilization. Superior device operation might otherwise be achieved by replacing such large switches with linear regulators, such as low dropout (LDO) regulators or the like, to regulate power to the USB XCVR 113 and external devices. Such regulators, however, are even larger than the switches SW1 and SW2. If used alone, the switches SW1 and SW2 can not otherwise be designed appreciable smaller since small switches have large series switch resistances. Larger switch resistance results in significant voltage drop from VINUSB to VBUS so that the voltage of VBUS might drop below the target minimum voltage level. Also, significant voltage drop results in very poor load regulation of VBUS. In summary, the switches SW1 and SW2, if used alone, consume very large switch area, cause poor load regulation, and further cause large host-enabling switching transients potentially resulting in unreliable operation or even device failure. As described further below, a charging function is provided to charge VBUS before both switches SW1 and SW2 are closed. Also, the feedback node 211 is switched from regulating VINUSB to regulating VBUS in the host mode. The additional charging function and adaptive feedback as described below alleviate the potential problems of large switching transients and poor load regulation. Also, the switches SW1 and SW2 may be reduced in size to save valuable space. In one illustrated embodiment, the charge circuit 203 and the additional switches SW3 and SW4 are controlled to provide the charging function and adaptive feedback. In another illustrated embodiment, the configuration and control of the switches SW3 and SW4 are adjusted to provide both the charging and adaptive feedback functions to eliminate the charge circuit 203.

Figure 3:
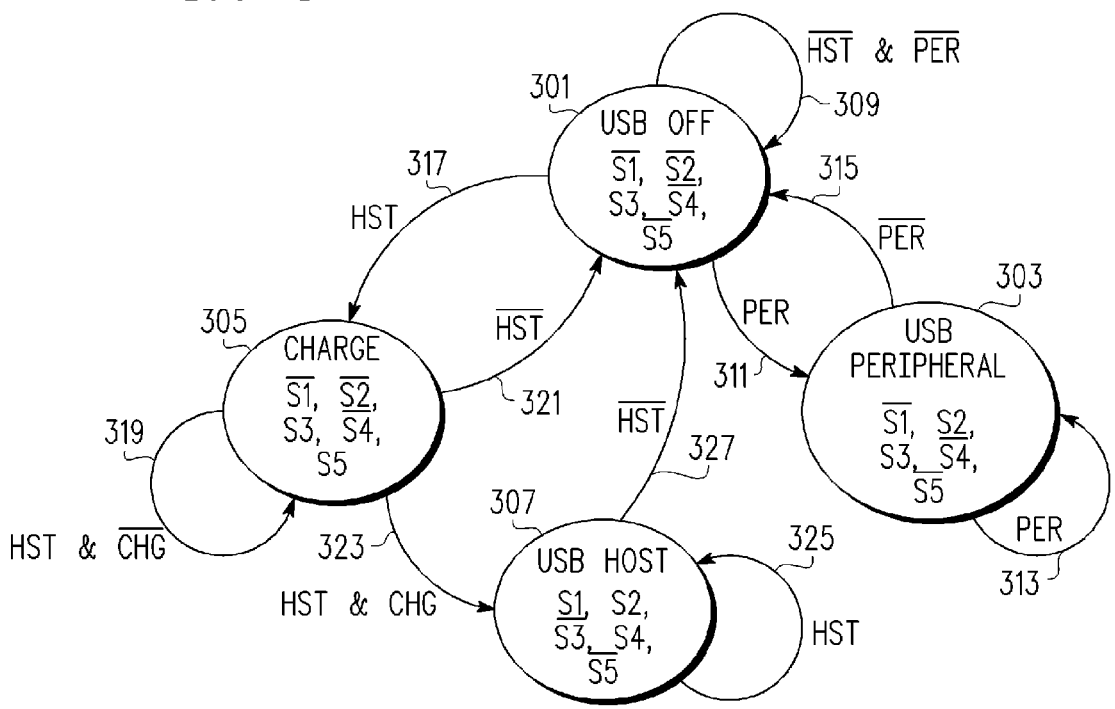
FIG. 3 is a state diagram illustrating exemplary operation of the controller of FIG. 2 for controlling the switches SW1-SW5 to switch between USB OFF mode, USB PERIPHERAL mode, CHARGE mode and USB HOST modes of operation according to an exemplary embodiment.
Figure 4:
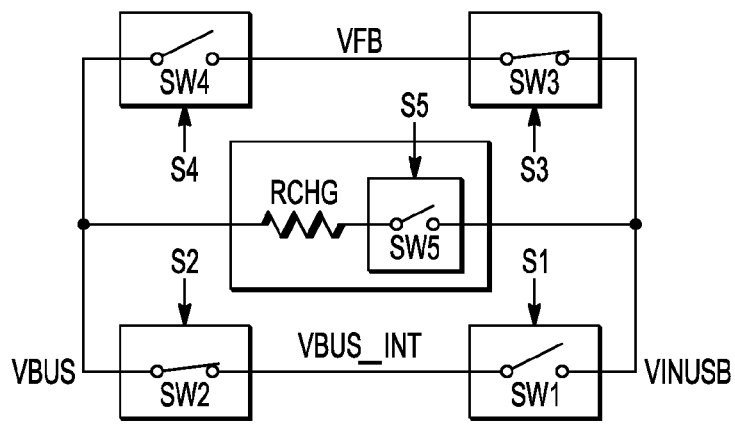
FIGS. 4, 5 and 6 are simplified schematic and block diagrams illustrating the respective states of the switches SW1-SW5 of FIG. 3 for the USB PERIPHERAL mode, the CHARGE mode and the USB HOST mode, respectively.
Figure 5:
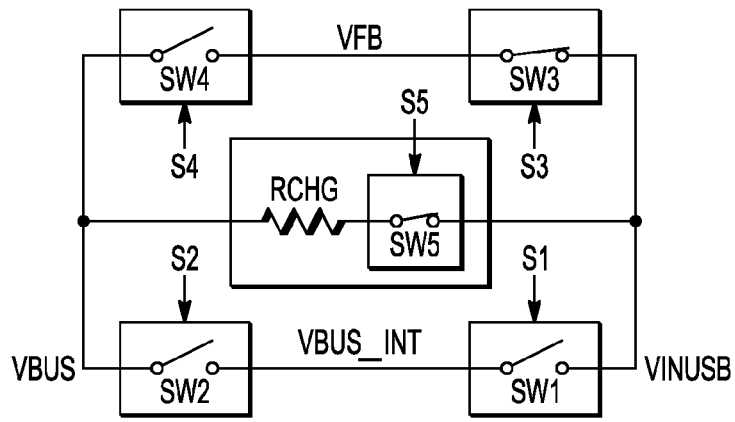
Figure 6:
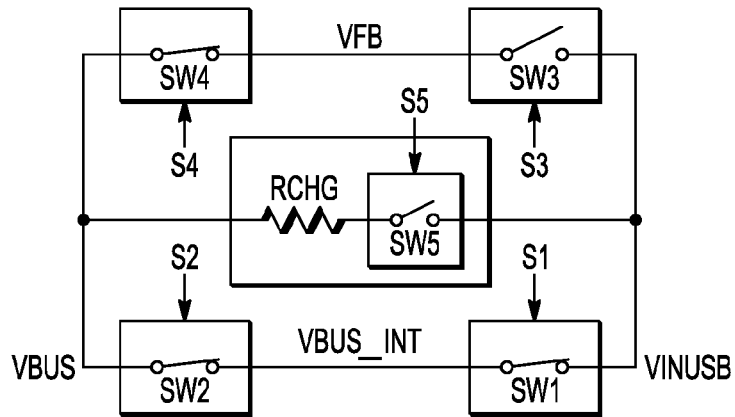

FIG. 3 is a state diagram illustrating exemplary operation of the controller 217 for controlling the switches SW1-SW5 to switch between USB OFF mode, USB PERIPHERAL mode, CHARGE mode and USB HOST modes of operation according to an exemplary embodiment. FIGS. 4, 5 and 6 are simplified schematic and block diagrams illustrating the respective states of the switches SW1-SW5 for the USB PERIPHERAL mode, the CHARGE mode and the USB HOST mode, respectively. The state diagram illustrates four states including a first state 301 when operating in the USB OFF mode as exemplified by the switch states of FIG. 2, a second state 303 when operating in the USB PERIPHERAL mode as exemplified by the switch states of FIG. 4, a third state 305 when operating in the intermediate CHARGE mode exemplified by the switch states of FIG. 5, and a fourth state 307 when operating in the USB HOST mode as exemplified by the switch states of FIG. 6. In the state diagram, state transitions are indicated by arrows labeled with signal names causing the transitions from one state to another. A signal name with an overstrike (e.g., $\overline{S1}$) denotes that the signal is asserted low indicating a false state or "not true", and a signal name without the overstrike indicates that the signal is asserted high indicating a true state or "true". Thus, the USB OFF mode is indicated when both the HST & PER signals are asserted low as indicated by arrow 309. Operation remains in state 301 as long as both of these signals are low or false. It is noted that the HST and PER signals may both be asserted low or may otherwise be asserted to opposite states, but they are not both asserted high together. Each state is illustrated using an oval shape with a name denoting the USB mode of operation and the corresponding states of the signals S1-S5 defining the states of the corresponding switches SW1-SW5, respectively. Thus, in state 301 for the USB OFF mode, signals S1, S2, S4 and S5 are asserted low so that switches SW1, SW2, SW4 and SW5 are opened and signal S3 is asserted high so that switch SW3 is closed as shown in FIG. 2.

Operation transitions to state 303 for the USB PERIPHERAL mode of operation when the PER signal is asserted high as indicated by arrow 311. In the USB PERIPHERAL mode in state 303, the signal S2 is asserted high so that the switch SW2 is closed as shown in FIG. 4, whereas the signals S1, S3, S4 and S5 and the states of the corresponding switches SW1, SW3, SW4 and SW5 remain unmodified. When switch SW2 is closed with reference to FIGS. 1, 2 and 4, VBUS is coupled to VBUS_INT so that an external device provides source voltage for the USB internal regulator 207 via VBUS to provide power to the USB XCVR 113. Operation remains in state 303 while PER is asserted high as indicated by arrow 313. Operation returns to state 301 when PER is asserted low as indicated by arrow 315.

Operation transitions to state 305 to operate in the CHARGE mode when the HST signal is asserted high as indicated by arrow 317. In the CHARGE mode in state 305, the signal S5 is asserted high so that the switch SW5 is closed as shown in FIG. 5, whereas the signals S1, S2, S3, and S4 and the states of the corresponding switches SW1, SW2, SW3 and SW4 remain unmodified. When switch SW5 is closed with reference to FIGS. 1, 2 and 5, the resistor RCHG is coupled between VINUSB and VBUS allowing current to flow from VINUSB through RCHG to charge the capacitor C2 and thus to increase the voltage of VBUS. The resistor RCHG has a resistance which allows a sufficient amount of current to flow from VINUSB to VBUS to charge the capacitor C2 at an acceptable rate without appreciably affecting regulation of VINUSB. The switch S5 and the resistor RCHG collectively form a switched charge resistance for charging VBUS. Note that since switch SW3 remains closed in state 305, the device regulator 101 continues to regulate the voltage of VINUSB. The size of RCHG is chosen in conjunction with the voltage of VINUSB so that VBUS charges to VMIN within a suitable amount of time as determined by the appropriate USB specification. VMIN is a voltage level that is sufficiently close to the operating voltage of VINUSB to enable USB operations. In one embodiment, for example, VMIN is approximately 4.4V. In state 305 for the CHARGE mode of operation, the comparator circuit 215 compares the voltage level of VBUS with VMIN. While the voltage of VBUS is below VMIN, the comparator circuit 215 keeps the CHG signal asserted low. Operation remains in state 305 while the HST signal is asserted high and while the CHG signal is asserted low as indicated by arrow 319. If the HST signal is asserted low at any time while in state 305, operation returns to state 301 as indicated by arrow 321.

When the voltage level of VBUS reaches VMIN, the comparator circuit 215 asserts the CHG signal high which is detected by the controller 217. Operation transitions to state 307 to operate in the USB HOST mode when the CHG signal is asserted high while HST remains asserted high as indicated by arrow 323. In the USB HOST mode in state 307, the signals S1-S5 all change state so that the switches SW1-SW5 all change state as shown in FIG. 6. With reference to FIGS. 1, 2 and 6, the signal S5 is asserted low to turn off the switch SW5 to terminate charging of VBUS via the resistor RCHG. Signals S1 and S2 are asserted high to turn on both switches SW1 and SW2 so that the device regulator 101 provides source voltage to both the USB internal regulator 207 and to the external device(s). Since the voltage of VBUS has been charged to VMIN which is sufficiently close to the regulated level of VINUSB, the closing of both switches SW1 and SW2 does not appreciably modify the voltage level VINUSB. Furthermore, the S3 signal is asserted low to open the switch SW3 and the S4 signal is asserted high to close the switch SW4. In this manner, VFB is coupled to VBUS rather than VINUSB so that the device regulator 101 now regulates the voltage of VBUS rather than VINUSB. Since voltages are developed across the switches SW1 and SW2 and since VBUS is regulated to the "normal" voltage level of VINUSB, the voltage level of VINUSB increases slightly. However, this voltage increase is relatively minor and does not appreciably affect operation of the device circuitry 103. In this manner, operation remains stable and load regulation is good. Operation remains in state 307 while the HST signal is asserted high as indicated by arrow 325 and operation returns to state 301 if the HST signal is asserted low as indicated by arrow 327.

The switches SW1 and SW2 are made sufficiently large to reduce voltage drop across and to minimize power loss through the switches during the USB HOST mode of operation. Since the device regulator 101 regulates the voltage of VBUS in the USB HOST mode, the voltage level of VBUS remains at the regulated voltage level and load regulation remains at the proper level. Also, VINUSB does not decrease but instead increases slightly above the normally regulated voltage level while switches SW1 and SW2 are turned on. In this manner, the switches SW1 and SW2 are made smaller for efficient space utilization. The size of the switches SW1 and SW2 is determined by the acceptable voltage increase of VINUSB and the acceptable power loss through (and voltage drop across) the switches SW1 and SW2. The switch SW5 may be made relatively small. In one embodiment, the charge circuit 203 includes only the switch SW5 which also serves as the series resistance to replace the resistor RCHG so that the resistor RCHG may be eliminated. The switch SW5 need only be made large enough to enable charging of the capacitor C2 in a sufficient amount of time for powering external devices and activating USB communications. The charge circuit 203 is implemented in an alternative embodiment (shown with dashed lines) using a current source 204 which is activated by the signal S5 to charge the capacitor C2. Alternatively, the switch SW5 is coupled to the current source which charges VBUS when the switch SW5 is closed. Once charged, the current source is de-activated or otherwise decoupled. The switches SW3 and SW4 may be made relatively small. The feedback input impedance of the device regulator 101 is relatively large, so that the series switch resistances of the switches SW3 and SW4 may be relatively large as long as they are relatively small compared to the input impedance of the device regulator 101. In one embodiment, for example, the input impedance of the device regulator 101 is about 500 kilohms (kΩ), so that the switches SW3 and SW4 may be made relatively small with relatively large resistances on the order of 100Ω or so.

FIG. 7 is a schematic and block diagram of a USB power control circuit 701 according to another embodiment which may also be used as the USB power control circuit 111. The USB power control circuit 701 is similar to the USB power control circuit 201 in which similar components have the same reference designators. The USB power control circuit 701 includes the switches SW1 and SW2, the capacitors C1 and C2, and the USB internal regulator 207 configured to operate in substantially the similar manner as the USB power control circuit 201. The charge circuit 203, however, is eliminated. The switches SW3 and SW4 are included in the USB power control circuit 701 but are modified as further described below to implement the charging function. The USB power control circuit 701 includes a USB control circuit 703 which replaces the USB control circuit 213. The USB control circuit 703 includes the comparator circuit 215 and a mode and switch controller 705 which is similar to the controller 217. The controller 705 receives (or provides) the HST and PER signals and receives the CHG signal in a similar manner as the controller 217. The controller 705 operates in substantially similar manner as the controller 217 except that it controls the switches SW3 and SW4 to control charging of the capacitor C2 rather than the charge circuit 203. The controller 705 provides signals S1-S4 to control the switches SW1-SW4, respectively, in a similar manner previously described. In FIG. 7 the switches SW1-SW4 are positioned for the USB OFF mode since switches SW1, SW2 and SW4 are opened while switch SW3 is closed. In this manner, VFB at node 211 is coupled to VINUSB via the closed switch SW3 so that the device regulator 103 regulates the voltage level of VINUSB in the USB OFF mode.

The switch SW3 is made larger than the switch SW4 so that the switch resistance of SW3 is substantially smaller than the switch resistance of SW4. As shown, the switch resistance of SW3 is graphically illustrated by a small resistor symbol show at 707 whereas the switch resistance of SW4 is graphically illustrated by a larger resistor symbol shown at 709. The combined resistance of the switches SW3 and SW4 when both are on is similar to the resistance of the resistor RCHG to implement a charging function from VINUSB to VBUS. In one embodiment, the series resistance 709 of SW4 is about 10× (ten times) the series resistance 707 of SW3. In a more specific embodiment, the series switch resistance 709 of switch SW4 is about 1 kΩ and the series switch resistance 707 of switch SW3 is about 100Ω.

Figure 9:
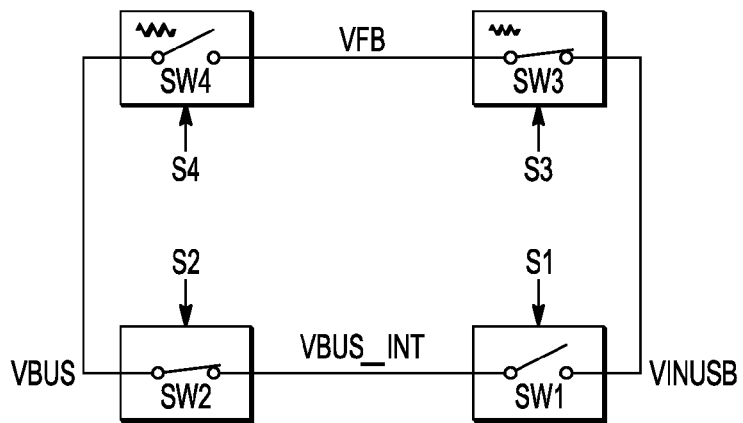
FIGS. 9, 10 and 11 are simplified diagrams illustrating the respective states of the switches SW1-SW4 of FIG. 8 for the USB PERIPHERAL mode, the CHARGE mode and the USB HOST mode, respectively.
Figure 10:
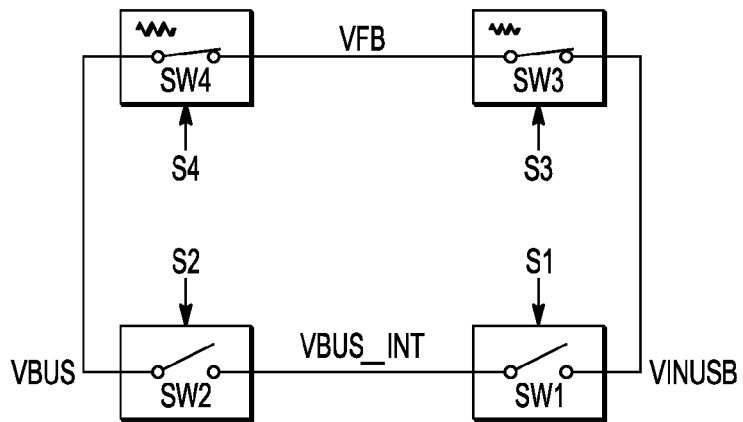
Figure 11:
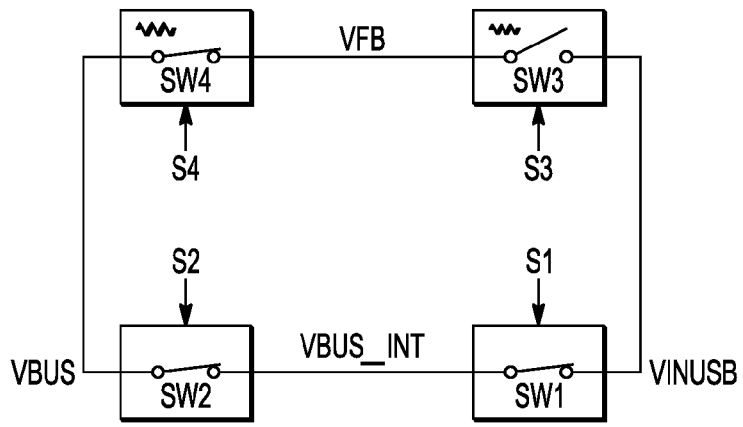

FIG. 8 is a state diagram illustrating exemplary operation of the controller 705 for controlling the switches SW1-SW4 to switch between USB OFF, USB PERIPHERAL, CHARGE, USB HOST modes of operation according to an exemplary embodiment. The state diagram of FIG. 8 is substantially similar to the state diagram of FIG. 3 in which the states 301, 303, 305 and 307 are replaced by similar states 801, 803, 805 and 807, respectively. FIGS. 9, 10 and 11 are simplified diagrams illustrating the respective states of the switches SW1-SW4 for the USB PERIPHERAL mode, the CHARGE mode and the USB HOST mode, respectively. The USB OFF mode of state 801 is exemplified by the switch states of FIG. 7, the USB PERIPHERAL mode of state 803 is exemplified by the switch states of FIG. 9, the intermediate CHARGE mode of state 805 is exemplified by the switch states of FIG. 10, and the USB HOST mode of state 807 is exemplified by the switch states of FIG. 11. The state transitions of the state diagram of FIG. 8 are the same as the transitions for the state diagram of FIG. 3 and are indicated by the same arrows with the same signal names. Again, a signal name with an overstrike denotes that the signal is asserted low indicating a false state or "not true".

The USB OFF mode of state 801 is indicated when both the HST & PER signals are asserted low as indicated by arrow 309 and operation remains in state 801 as long as both of these signals are low or false. In the USB OFF mode of state 801, signals S1, S2, and S4 are asserted low and signal S3 is asserted high so that switches SW1, SW2, and SW4 are opened and switch SW3 is closed as shown in FIG. 7. Operation transitions to the USB PERIPHERAL mode of state 803 when PER is asserted high as indicated by arrow 311, and operation remains in state 803 while PER remains asserted high as indicated by arrow 313. In the USB PERIPHERAL mode of state 803, signal S2 is asserted high so that switch SW2 is closed in a similar manner as previously described so that the USB XCVR 113 receives power from an external host device. Operation returns to USB OFF mode of state 801 when PER is asserted low as indicated by arrow 315 in the same manner as previously described. Operation advances to the CHARGE mode of state 805 when the HST signal is asserted as indicated by arrow 317. In state 805, the signal S4 is asserted to close switch SW4. With reference to FIGS. 1, 7 and 10, when both switches SW3 and SW4 are closed, VBUS is coupled to VINUSB through the switches SW3 and SW4. The combined resistance of SW3 and SW4 is similar to the resistance RCHG so that the capacitor C2 is charged in a period of time without significantly changing the voltage of VINUSB. If the switch resistance 707 of switch SW3 is denoted R3 and the switch resistance 709 of switch SW4 is denoted R4, then the voltage of VFB can be defined according to the following equation (1):

$$VFB = (VINUSB\_VBUS)*R4/(R3+R4) \qquad (1)$$

in which an asterisk "*" denotes multiplication and a forward slash "/" denotes division. If the voltage of VBUS is initially zero, the initial sag of VFB is not appreciable since R4 is significantly larger than R3. For example, if R4 is 10× R3, then VFB drops to 10/11 of its initial voltage when the switch SW4 is closed. The voltage of VFB approaches its initial level while the capacitor C2 is charged. In this manner, load regulation during charging remains substantially unchanged. Operation remains in state 805 while the CHG signal remains asserted low.

When the comparator circuit 215 detects that the voltage of VBUS reaches VMIN, it asserts the CHG signal and operation advances to the USB HOST mode of state 807 as indicated by arrow 323. In state 807, the signals S1, S2 and S4 are asserted high and the signal S3 is asserted low so that the switches SW1, SW2 and SW4 are closed and the switch SW3 is opened as shown in FIG. 11. As before, since the capacitors C1 and C2 are both charged to about the same voltage, the VINUSB and VBUS voltages are not appreciably affected when both of the switches SW1 and SW2 are closed. Also, the switch SW3 is opened and the switch SW4 is closed so that VFB is coupled to VBUS rather than VINUSB in a similar manner as previously described. Thus, the device regulator 101 regulates the voltage of VBUS rather than VINUSB in the USB HOST mode. Although the switch resistance R4 of the switch SW4 is larger since implemented with a physically smaller component, its resistance is still significantly smaller than the feedback input of the device regulator 101. In this manner, the device regulator 101 regulates VBUS to provide proper load regulation.

Several variations are possible for either of the embodiments illustrated by the USB power control circuits 201 and 701. For example, the switch SW1 may be closed at any time to power up the USB internal regulator 207 and/or the USB XCVR 113. The signal S1 may be asserted in states 305 and 805 to provide power to the USB internal regulator 207 and/or the USB XCVR 113 while charging the capacitor C2.

Figure 12:
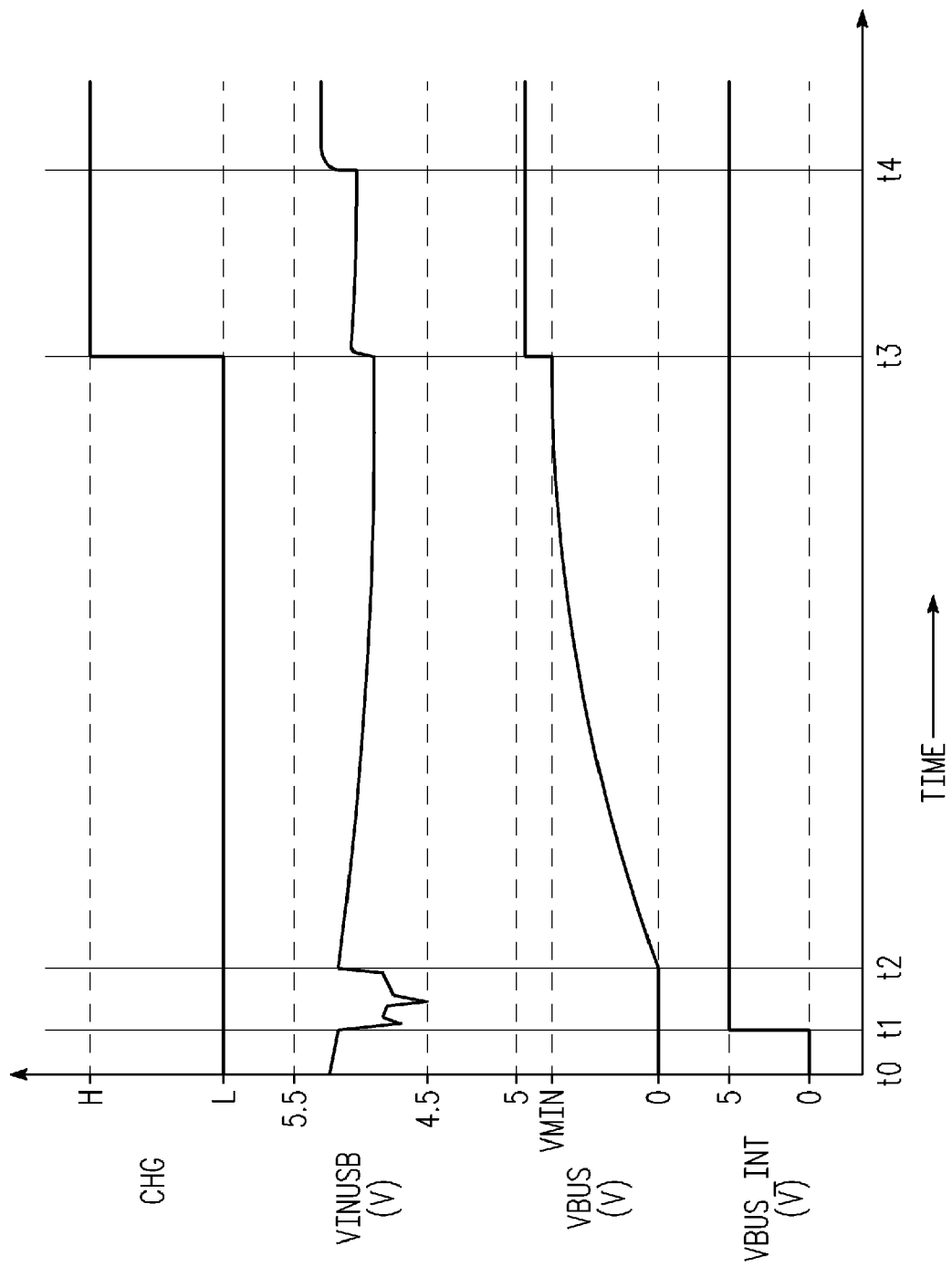
FIG. 12 is a graph diagram plotting the CHG signal and the VINUSB, VBUS and VBUS_INT voltages (V) versus TIME for either of the embodiments illustrated by the USB power control circuits of FIGS. 2 and 7.

FIG. 12 is a graph diagram plotting the CHG signal and the VINUSB, VBUS and VBUS_INT voltages (V) versus TIME for either of the embodiments illustrated by the USB power control circuits 201 and 701. At an initial time t0, the CHG signal is asserted low, the VINUSB is just below 5.5V, and VBUS and VBUS_INT are both at about 0V so that the USB power control circuit 111 is operating in the USB OFF mode. Although not shown, the switch SW3 is closed so that the device regulator 101 regulates VINUSB. At a subsequent time t1, the switch SW1 is closed so that VINUSB provides source voltage to VBUS_INT. The voltage of VINUSB has a transient droop to about 4.5V and then recovers back to its original value as VBUS_INT increases to about 5V. As noted above, the switch SW1 may be asserted at any time and not necessarily in any of the states or modes previously defined. The diagram illustrates the change of VINUSB in response to closing SW1 alone. At a subsequent time t2, either the switch SW5 is closed (for the USB power control circuit 201) or the switch SW4 is closed (for the USB power control circuit 701) and the voltage VBUS begins to increase while the capacitor C2 is charging. At a subsequent time t3, VBUS reaches the predetermined minimum voltage level VMIN and the comparator circuit 215 asserts the CHG signal high. In the illustrated embodiment, VMIN is approximately 4.4V. When the CHG signal is asserted high, the switch SW2 is closed so that VBUS increases to about the voltage of VINUSB. The switch SW3 is opened while SW4 is closed or otherwise remains closed so that also VINUSB slightly increases since regulation is switched from VINUSB to VBUS. At subsequent time t4, VINUSB rises somewhat (e.g., to about 5.3V) in response to an external load on VBUS causing additional voltage drop across the switches SW1 and SW2.

FIG. 12 illustrates that VINUSB remains relatively stable between allowable voltage levels of 4.5V to 5.5V during each of the operating modes and for various load conditions. VINUSB does not appreciably increase even as load is applied to the USB port 109 by external devices. VBUS rises to VMIN and remains at or above VMIN during USB HOST mode of operation. The charge time of VBUS from 0 to VMIN is configured to ensure that USB HOST mode is entered within a predetermined maximum period of time as determined by the appropriate specification. The charge time is determined or otherwise adjusted by the switch resistances of SW3 and SW4 or by selection of RCHG as previously described. The voltage of VBUS_INT remains relatively stable throughout changes of mode and load conditions.

A universal serial bus power control circuit according to one embodiment includes at least one first switch which selectively couples a power source node to an external power node when closed, a comparator which detects when the external power node is charged, a feedback node for enabling voltage regulation, a charge circuit and a controller. The charge circuit charges the external power node from the power source node and selectively couples the feedback node to at least one of the power source node and the external power node. The controller opens the first switch when the external power node is not charged, controls the charge circuit to charge the external power node while coupling the feedback node to the power source node, and closes the first switch and couples the feedback node to the external power node in a host mode when the external power node is charged.

In one embodiment of the universal serial bus power control circuit, the charge circuit is configured with two additional switches. A second switch with a first resistance is provided which selectively couples the power source node to the feedback node when closed, and a third switch with a second resistance is provided which selectively couples the feedback node to the external power node when closed. The second resistance is significantly greater than the first resistance. The controller closes the second switch and opens the third switch during an off mode so that the feedback node is coupled to the internal source node for regulating the voltage of the internal source node. The controller closes both of the second and third switches to enable charging of the external power node during a charge mode. In this case, the first and second resistances are collectively sufficiently large to provide the charging function without significantly affecting voltage regulation of the internal source node. The controller opens the second switch and closes the third switch during the host mode. Thus, when the external power node is sufficiently charged, the (at least one) first switch is closed so that the internal source node provides power to the external power node. Also during the host mode, the third switch is closed for adaptive feedback so that the voltage of the external power node is regulated rather than the internal source node.

In an alternative embodiment of the universal serial bus power control circuit, the charge circuit includes second and third switches and a controlled current source. In this embodiment the second and third switches are not both closed at the same time but are controlled for adaptive feedback. The controlled current source is controlled by the controller during the charge mode to provide the charge function. The controlled current source may be implemented in any suitable manner, such as a switched resistance or a controlled current source or the like.

A method of providing external power on a universal serial bus according to one embodiment includes coupling a feedback node to an internal source node when in an off mode and when in a charge mode, charging an external power node from the internal source node when in the charge mode, and, when the external power node is charged, entering a host mode by coupling the internal source node to the external power node, coupling the feedback node to the external power node, and decoupling the feedback node from the internal source node.

The method may include coupling a charge path from the internal source node to an external power node and decoupling the charge path when not in the charge mode. The method may include activating a current source to charge the external power node. The method may include coupling a charge resistor between the internal source node and the external power node to charge the external power node. The method may include selectively closing a first switch with a first resistance provided between the feedback node and the internal source node, and closing a second switch with a second resistance provided between the feedback node and the external power node. In this case the second resistance is significantly greater than the first resistance. The first switch is closed while the second is opened for regulating voltage of the internal source node, both switches are closed for charging the external power node, and the second switch is closed while the first is opened for regulating the voltage of the external power node.

The method may include activating a separate current path provided between the internal source node and the external power node for charging the external power node.

An electronic device according to one embodiment includes an internal feedback node, a regulator, an external power node, and a universal serial bus power control circuit. The regulator provides source voltage on an internal source node and has an internal feedback input coupled to the internal feedback node for regulating voltage level. The universal serial bus power control circuit includes at least one first switch which selectively couples the internal source node to the external power node when closed, a charge circuit, a comparator, and a controller. The charge circuit charges the external power node from the internal source node and selectively couples the internal feedback node to at least one of internal source node and the external power node. The comparator detects when the external power node is charged. The controller opens the first switch when the external power node is not charged, controls the charge circuit to charge the external power node while coupling the internal feedback node to the internal source node, and closes the first switch and couples the internal feedback node to the external power node in a host mode when the external power node is charged.

In one embodiment of the electronic device, the charge circuit is implemented with second and third switches which are controlled for adaptive feedback. In an alternative embodiment, the second and third switches perform adaptive feedback and a separate controlled current path performs the charging of the external power node. The controlled current path may be implemented as a switched resistance or a controlled current source or the like. The electronic device may include an internal power node, where the at least one first switch includes a first switch coupled between the internal source node and the internal power node and a second switch coupled between the internal power node and the external power node. The universal serial bus power control circuit is particularly advantageous for an on-the-go USB control circuit for the electronic device.

Although the present invention has been described in considerable detail with reference to certain preferred versions thereof, other versions and variations are possible and contemplated. For example, circuits or logic blocks described herein may be implemented as discrete circuitry or integrated circuitry or software or any alternative configurations. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A universal serial bus power control circuit, comprising:
   at least one first switch which selectively couples a power source node to an external power node when each of said at least one first switch is closed;
   a comparator which detects when said external power node is charged;
   a feedback node for enabling voltage regulation;
   a charge circuit which charges said external power node from said power source node, and which selectively couples said feedback node to at least one of said power source node and said external power node; and
   a controller which opens at least one of said at least one first switch when said external power node is not charged, which controls said charge circuit to charge said external power node while coupling said feedback node to said power source node, and which closes each of said at least one first switch and couples said feedback node to said external power node in a host mode when said external power node is charged.

2. The universal serial bus power control circuit of claim 1, wherein said charge circuit comprises:
   a second switch with a first resistance which selectively couples said power source node to said feedback node when closed;
   a third switch with a second resistance which selectively couples said feedback node to said external power node when closed, wherein said second resistance is significantly greater than said first resistance; and
   wherein during an off mode said controller closes said second switch and opens said third switch, wherein during a charge mode said controller closes both of said second and third switches to enable charging of said external power node, and wherein during said host mode said controller opens said second switch and closes said third switch.

3. The universal serial bus power control circuit of claim 1, wherein said charge circuit comprises:
   a second switch coupled between said power source node and said feedback node;
   a third switch coupled between said feedback node and said external power node;
   a controlled current source coupled between said power source node and said external power node; and
   wherein during an off mode said controller turns off said controlled current source, closes said second switch and opens said third switch, wherein during a charge mode said controller turns on said controlled current source, closes said second switch and opens said third switch, and wherein during said host mode said controller turns off said controlled current source, opens said second switch and closes said third switch.

4. The universal serial bus power control circuit of claim 1, wherein said comparator compares voltage of said external power node with a predetermined minimum voltage level.

5. The universal serial bus power control circuit of claim 1, wherein said at least one first switch comprises:
   a first switch which selectively couples said power source node to an internal power node when closed;
   a second switch which selectively couples said internal power node to said external power node when closed; and
   wherein said controller opens at least one of said first and second switches when not in said host mode and which closes both of said first and second switches in said host mode and when said external power node is charged.

6. The universal serial bus power control circuit of claim 3, wherein said controlled current source comprises a fourth switch coupled in series with a resistance.

7. A method of providing external power on a universal serial bus, comprising:
   coupling a feedback node to an internal source node when in an off mode and when in a charge mode;
   charging an external power node from the internal source node when in the charge mode; and
   when the external power node is charged, entering a host mode by coupling the internal source node to the external power node, coupling the feedback node to the external power node and decoupling the feedback node from the internal source node.

8. The method of claim 7, wherein said charging the external power node comprises coupling a charge path from the internal source node to an external power node and decoupling the charge path when not in the charge mode.

9. The method of claim 7, wherein said charging the external power node comprises activating a current source.

10. The method of claim 7, wherein said charging the external power node comprises coupling a charge resistor between the internal source node and the external power node.

11. The method of claim 7, wherein said coupling the internal source node to the external power node comprises closing each of at least one first switch coupled between the internal source node to the external power node.

12. The method of claim 7, wherein:
   said coupling a feedback node to the internal source node comprises closing a first switch with a first resistance provided between the feedback node and the internal source node;
   wherein said coupling the feedback node to the external power node comprises closing a second switch with a second resistance provided between the feedback node and the external power node, wherein the second resistance is significantly greater than the first resistance;
   wherein said charging the external power node from the internal source node comprises closing both of the first and second switches; and
   wherein said decoupling the feedback node from the internal source node comprises opening the first switch.

13. The method of claim 7, wherein:
   said coupling the internal source node to the external power node comprises closing each of at least one first switch coupled in series between the internal source node and the external power node;

wherein said coupling a feedback node to the internal source node comprises closing a second switch provided between the feedback node and the internal source node;

wherein said decoupling the feedback node from the internal source node comprises opening the second switch;

wherein said coupling the feedback node to the external power node comprises closing a third switch provided between the feedback node and the external power node; and wherein said charging an external power node comprises activating a current path provided between the internal source node and the external power node.

14. The method of claim 12, wherein said coupling the internal source node to the external power node comprises closing each of at least one third switch provided between the internal source node and the external power node.

15. An electronic device, comprising:
an internal feedback node;
a regulator which provides source voltage on an internal source node, wherein said regulator has an internal feedback input coupled to said internal feedback node for regulating voltage level;
an external power node; and
a universal serial bus power control circuit, comprising:
at least one first switch which selectively couples said internal source node to said external power node when closed;
a charge circuit which charges said external power node from said internal source node, and which selectively couples said internal feedback node to at least one of said internal source node and said external power node;
a comparator which detects when said external power node is charged; and
a controller which opens said at least one first switch when said external power node is not charged, which controls said charge circuit to charge said external power node while coupling said internal feedback node to said internal source node, and which closes said at least one first switch and couples said internal feedback node to said external power node in a host mode when said external power node is charged.

16. The electronic device of claim 15, wherein said charge circuit comprises:
a second switch with a first resistance which selectively couples said internal source node to said internal feedback node when closed;
a third switch with a second resistance which selectively couples said internal feedback node to said external power node when closed, wherein said second resistance is significantly greater than said first resistance; and
wherein during an off mode said controller closes said second switch and opens said third switch, wherein during a charge mode said controller closes both of said second and third switches, and wherein during said host mode said controller opens said second switch and closes said third switch.

17. The electronic device of claim 15, wherein said charge circuit comprises:
a controlled current path coupled between said internal source node and said external power node; and
a controlled switch circuit coupled to said internal feedback node and coupled between said internal source node and said external power node.

18. The electronic device of claim 15, further comprising:
an internal power node;
a universal serial bus internal regulator coupled to said internal power node; and
wherein said at least one first switch comprises:
a first switch coupled between said internal source node and said internal power node; and
a second switch coupled between said internal power node and said external power node.

19. The electronic device of claim 15, wherein said universal serial bus power control circuit is compliant with USB OTG.

20. The electronic device of claim 17, wherein said controlled current path comprises a switched charge resistance.

* * * * *